United States Patent [19]

Clark et al.

[11] Patent Number: 4,721,546
[45] Date of Patent: Jan. 26, 1988

[54] SPIN-WELDING APPARATUS

[75] Inventors: Kenneth R. Clark, Oxfordshire; John P. Bilko, Wiltshire, both of England

[73] Assignee: Metal Box p.l.c., Reading, England

[21] Appl. No.: 864,141

[22] Filed: May 16, 1986

[30] Foreign Application Priority Data

May 24, 1985 [GB] United Kingdom ................. 8513240

[51] Int. Cl.⁴ ............................................. B29C 65/06
[52] U.S. Cl. ................... 156/567; 156/73.5; 156/580; 228/2; 228/112
[58] Field of Search ............... 156/73.5, 69, 294, 580, 156/423, 567; 228/2, 112, 113; 264/68

[56] References Cited

U.S. PATENT DOCUMENTS

| | | | |
|---|---|---|---|
| 3,499,068 | 3/1970 | Brown | 156/73.5 |
| 3,595,462 | 7/1971 | Hirayama | 156/73.5 |
| 3,607,581 | 9/1971 | Adams | 156/73.5 |
| 3,726,748 | 4/1973 | Mistarz et al. | 156/580 |
| 3,888,405 | 6/1975 | Jones et al. | 228/2 |
| 4,090,898 | 5/1978 | Tuskos | 156/73.5 |
| 4,252,587 | 2/1981 | Harden et al. | 156/580 |
| 4,552,609 | 11/1985 | Larsen | 156/73.5 |

*Primary Examiner*—Michael Wityshyn
*Attorney, Agent, or Firm*—Diller, Ramik & Wight

[57] ABSTRACT

Apparatus for spin-welding comprises a spin welding machine having a spin welding head, a ram assembly, and a feed mechanism; the ram assembly is driven from a shaft and the feed mechanism comprises a rotating turret mounted on a shaft which is driven from the shaft via a Geneva mechanism. The spin welding head is driven by a low inertia DC servo motor operated by a programmable logic controller and timed from a switch unit driven off the shaft.

10 Claims, 12 Drawing Figures

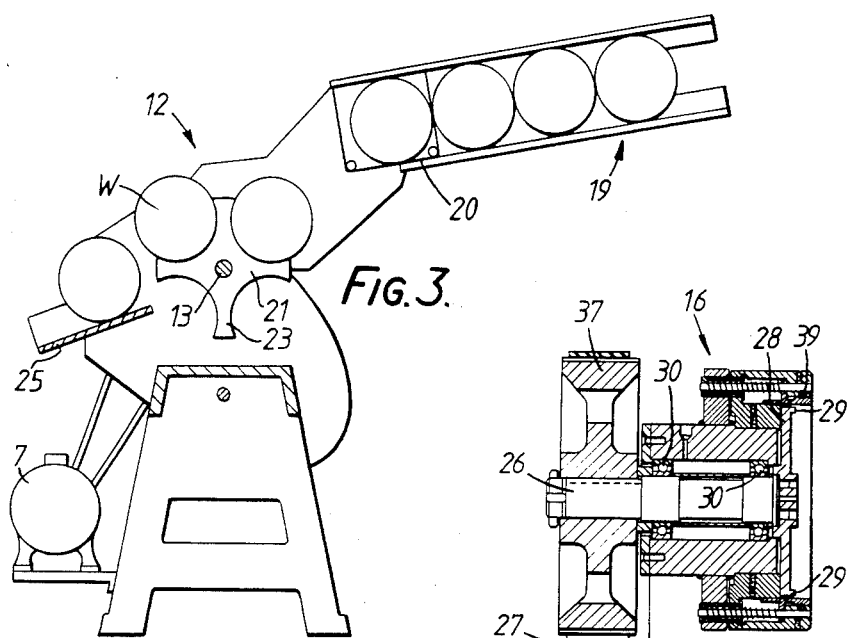
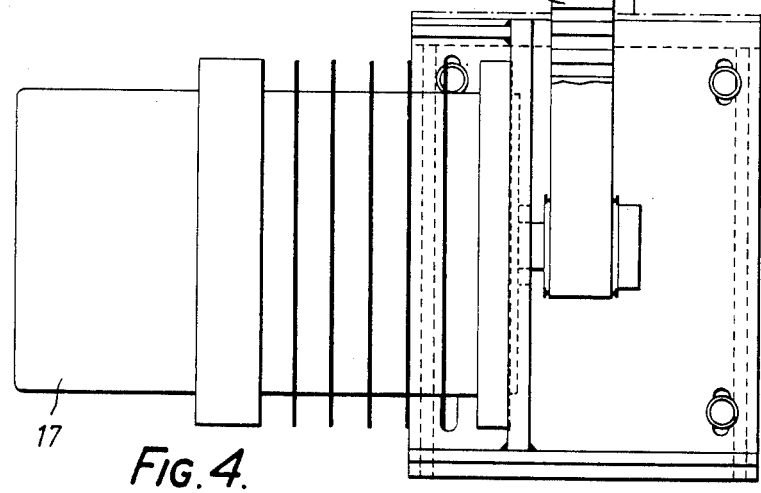

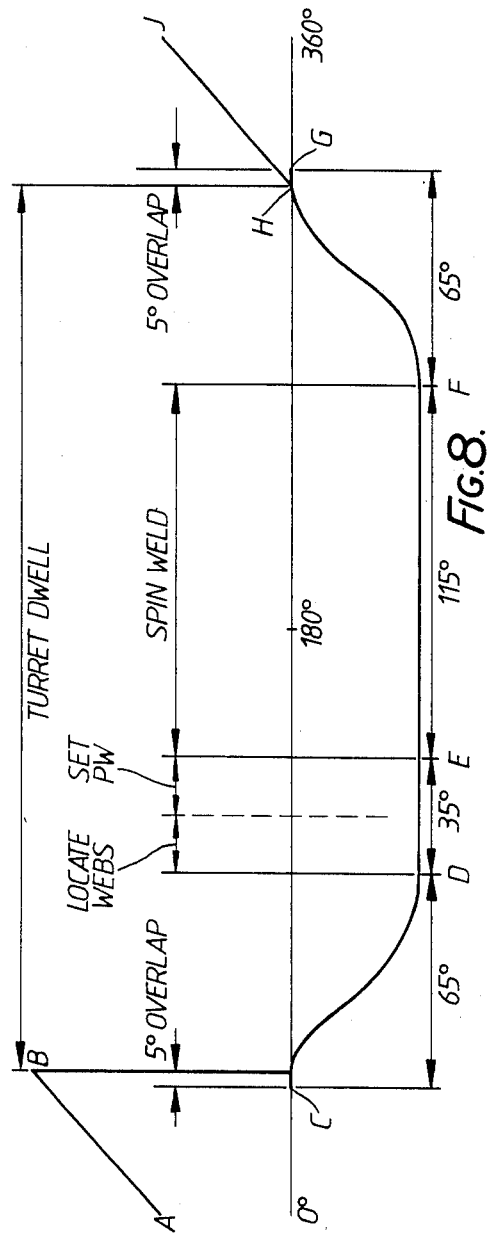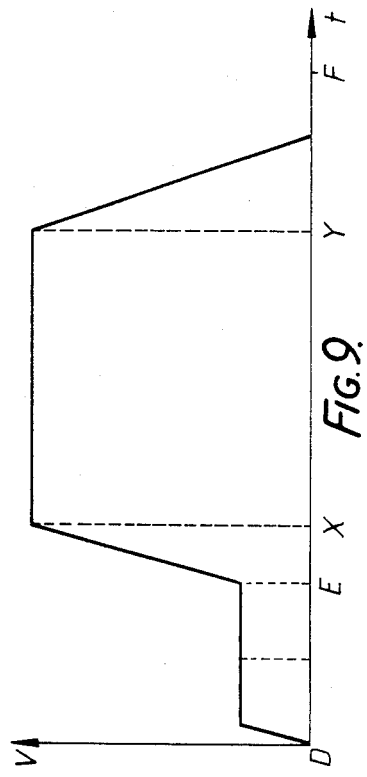
FIG.8.
FIG.9.

SPIN-WELDING APPARATUS

BACKGROUND TO THE INVENTION

The invention relates to apparatus for spin-welding, which is a known technique for welding together plastics components which are assembled with opposed annular surfaces, in which one of the components is spun at high speed relative to the other to cause melting and subsequent fusion of the plastics material at the interface of the opposed surfaces.

DESCRIPTION OF THE PRIOR ART

In known methods of spin welding the energy for the weld is generally provided by a rotating chuck. In a first type of known method pre-assembled articles to be spin welded are mounted on a chuck which is brought into and out of engagement with a rotating drive motor and are spun thereby for a period sufficient to create a weld. In a second known method one of the components of the article to be welded is rotated at high speed on a chuck and is subsequently brought into engagement with the other component. Drive to the chuck is discontinued, and the two components are welded together as the energy of rotation of the chuck is dissipated as frictional heat at the component interface. In both the prior methods precise control of the duration of the weld process and the amount of frictional heat generated at the weld are difficult to achieve.

SUMMARY OF THE INVENTION

According to the invention there is provided a spin welding apparatus for welding together two parts of an article comprising a feed mechanism for successively feeding pre-assembled articles to a work station on the apparatus, a spin welding head for spinning one of the parts relative to the other at the work station to form a weld, and a ram assembly for moving articles at the work station into engagement with the spin welding head, wherein the feed mechanism and the ram assembly are driven in timed relation from a first motor-driven shaft and wherein the spin welding head is driven by a servo motor, the drive of which is timed by a switch unit driven from the first shaft.

BRIEF DESCRIPTION OF THE DRAWINGS

FIG. 3 is a diagrammatic sectional view of the machine of FIG. 2 taken along line A—A;

FIG. 4 is a longitudinal sectional view through the spin-welding head of the machine;

FIG. 8 is a graphic representation of the machine cycle;

FIG. 9 is a diagrammatic time/velocity graph for the spin motor of the machine.

DETAILED DESCRIPTION OF THE INVENTION

Figure 1:
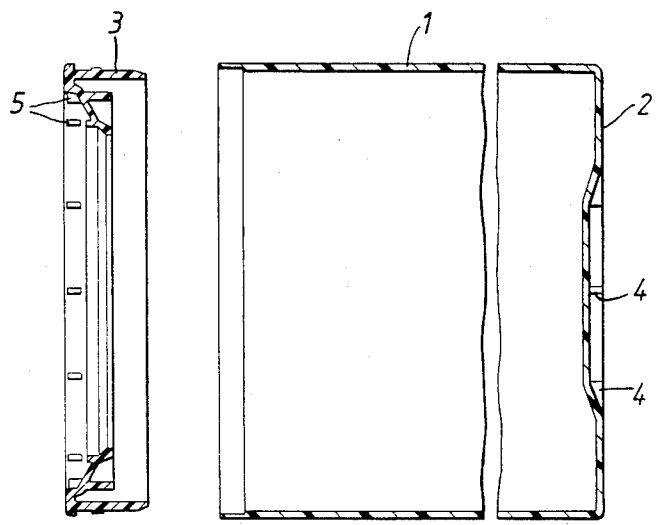
FIG. 1 shows a longitudinal section through a cylindrical container body and an end component therefor.

Referring to FIG. 1, there is shown a container comprising a moulded plastics cylindrical body 1 provided with an integral bottom panel 2 and a plug fit end component in the form of a moulded plastics ring 3 adapted to be assembled into the open end of the body. The bottom panel of the body has a plurality of external webs 4 which engage fixed pins located on the ram of the machine such that they prevent the body rotating during welding. The ring 3 also has a number of external webs 5 which engage one or more driving pins in the spinning head of the machine and thereby provide drive for the spin-welding process. Components such as shown in FIG. 1 are described in greater detail in our co-pending British patent application No. 8510817.

Figure 2:
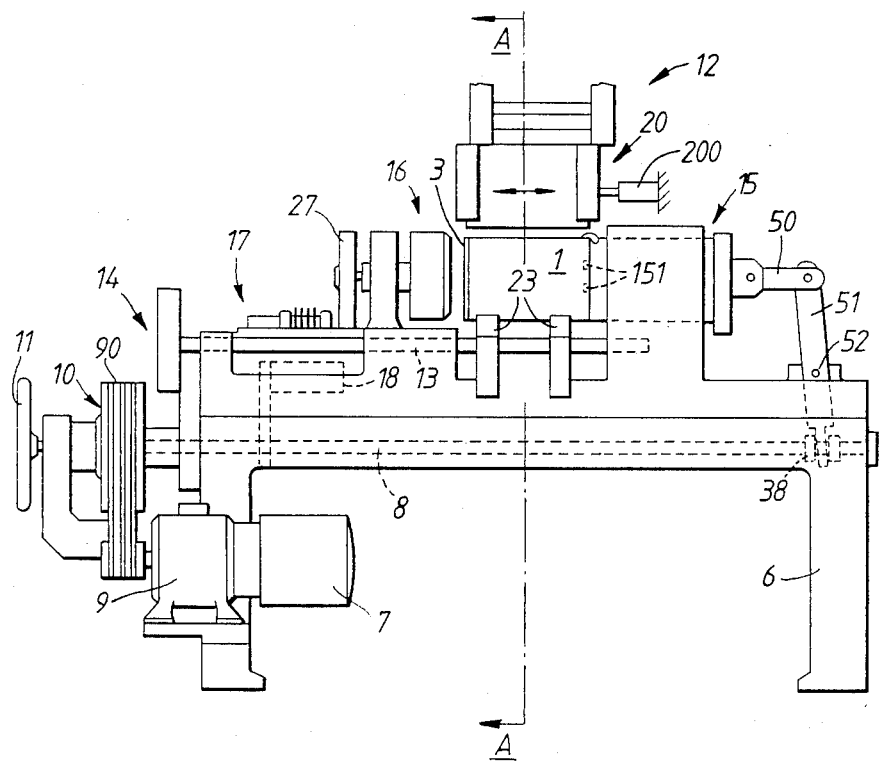
FIG. 2 is a side view of a spin-welding machine.

As shown in FIG. 2, the spin-welding machine is supported on a frame 6 and has a main AC drive motor 7 driving a primary drive shaft 8 through a geared speed reduction unit 9, drive belt 90, and a pneumatic clutch 10. The clutch is remotely operated by a programmable logic control system, FIGS. 10 and 11. A hand wheel 11 may be used for manual rotation of the drive shaft during setting up. A brake (not shown) may also be provided. The feed mechanism 12, by which pre-assembled containers are fed to the work station, is driven from a secondary drive shaft 13 which is itself driven in an indexing motion from the shaft 8 via a Geneva mechanism 14. A ram assembly 15, also driven from shaft 8, is operative to push the container at the work place into engagement with a spin-welding head 16. The spin-welding head is driven by a servo motor 17 controlled by a switch unit 18 driven off the shaft 8.

The body 1 and ring 3 are pre-assembled before welding and are fed to the machine by a feed mechanism shown in FIG. 3. The pre-assembled containers have already been turned on their sides before being fed into the machine so they can roll down the infeed chute 19. A gate 20, which is shown only diagrammatically in FIGS. 2 and 3, stops them before they can reach a transfer turret 21 mounted for intermittent rotation on the secondary drive shaft 13. The gate is timed in sequence with the machine from the switch unit 18 and is operated when the transfer turret has stopped rotating. The gate 20 moves sideways until a container therein is lined up with turret guides. The container is then free to drop under gravity into the transfer turret. The sideways movement of the gate 20 causes it to interfere with the next following container in feed chute 19, preventing it from dropping. After a predetermined period, the gate is returned to its original position, allowing the next container to drop into the gate. A pneumatic cylinder 200 with a solenoid valve (not shown) is used to operate the gate.

Rotation of the transfer turret 21 carries the containers from the infeed to the work station W and then to the discharge chute 25. In this example the interrupted motion of the transfer turret is provided by the Geneva mechanism 14. The transfer turret comprises a pair of plates 23 mounted on shaft 13 and having peripheral part-circular cut-outs therein to support the containers during their travel thereon. Outside guides and a rail prevent the containers being disturbed while the turret rotates.

The spin-welding process is carried out at the work station which is shown at W in FIG. 3. At the work station, the container is held between the spin welding head shown in FIGS. 4 and 5, and the ram assembly 15.

The spin-welding head comprises a low inertia mechanism driven by a DC low inertia rare earth brushless servo motor 17 as shown in FIG. 4. Drive is taken to the spin welding head shaft 26 via a toothed belt 27. The driven pulley 37 is mounted on one end of the shaft 26 which is horizontal. A disc 28 of lightweight alloy is bolted directly to the opposite end of the shaft 26. Machined in its exposed face, the disc 28 has driving pins 29 which engage in the ring 3 and cooperate with the external webs 5 thereof to cause the ring to be driven in rotation. In order to keep friction as low as possible the shaft 26 is mounted in two ball races 30.

The ram movement, to push a container into the spin welding head, is actuated by a cam 38 (FIG. 2) driven at the machine cycle speed on the shaft 8. This cam action is transferred to the ram slider by a lever arm 51 pivoted at 52 and a connecting link 50. Dogs 151 located on the front face of the ram engage with the webs 4 to prevent the body 1 from rotating during welding.

Figure 5:
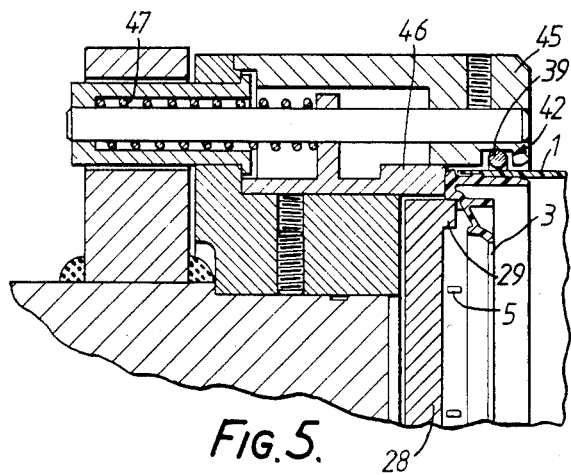
FIG. 5 is an enlarged view of part of the spin-welding head showing a container body and end component engaged therewith.

When the container formed by the assembled container body 1 and end component 3 is pushed by the ram assembly 15 into engagement with the spin-welding head 16 as shown in FIGS. 4 and 5, the end face of the end component 3 comes into contact with an ejector ring 46 which yields axially under the action of a plurality of coil springs 47 spaced circumferentially around the ring 46 (FIG. 5). The ring 46 is held in the position shown in FIG. 5 during welding and the correct end pressure for the welding process is provided by the coil springs 47 via the ejector ring.

Radial pressure is applied during the welding process by means of a tourniquet comprising a loop of steel wire cable 39 which is retained in an annular groove 42 in a cable retaining housing 45 mounted on the spin-welding head. When the tourniquet is in a relaxed condition, it forms a loop having a diameter slightly greater than that of the container to be welded. When no container is held in position for welding, the ejector ring moves axially under the influence of the springs 47 to close off the annular groove 42 and to retain the wire cable 39 therein, as shown in FIG. 4.

Figure 6:
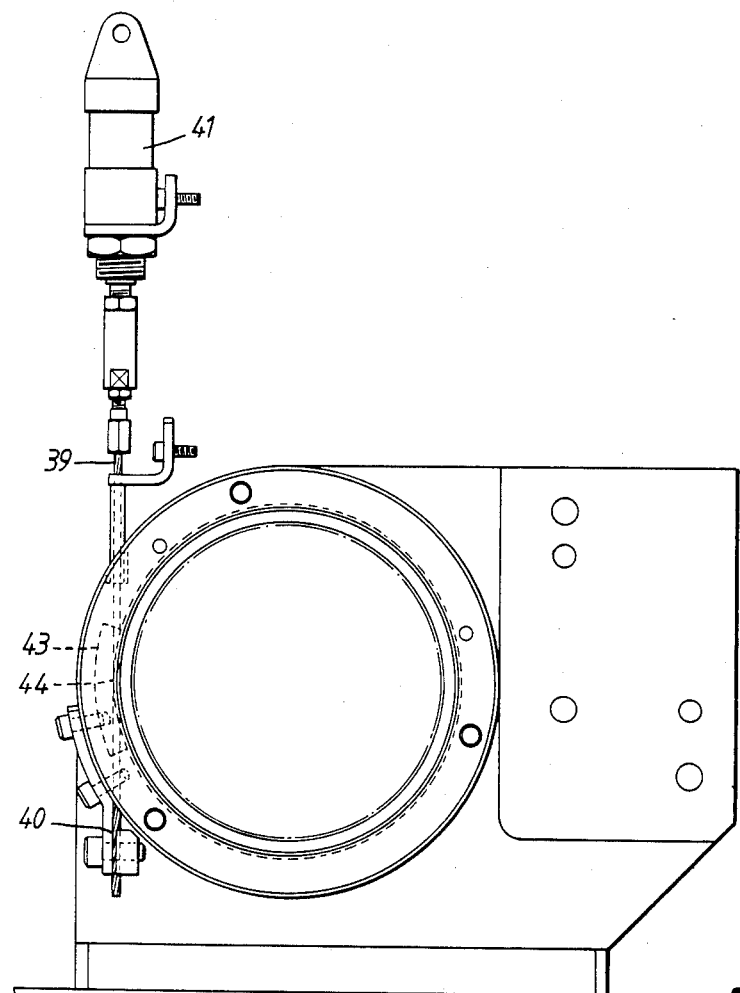
FIG. 6 is a side elevational view of a device for exerting radial compressive pressure which is mounted on the spin-welding head.

As shown in FIG. 6, one end of the cable 39 is rigidly anchored at 40 whilst the other end is attached to a pneumatic cylinder 41. A small release area 43 is cut out of the cable retaining housing 45 to allow the cable to cross over at 44 at the cable's entry and exit points. During the operation of the machine, the assembled container body and end component are fed into the cable retaining housing and through the loop of the cable 39. The driving pins 29 are located as described below and the pneumatic cylinder 41 is operated to apply a tension to the cable such that the cable loop diameter is decreased, thereby producing the desired external pressure on the body 1 necessary for the spin-welding process. After welding, the pneumatic cylinder 41 is returned to its original position, releasing the external pressure and allowing the container to be ejected. As the ram assembly 15 moves back, the ejector ring 46 is free to move forward, thereby pushing the now welded container out of the cable retaining housing and closing the annular groove 42. The manner of overlap of the wire cable is shown more clearly in FIG. 7.

For any given components to be spin-welded, there will be a preferred or medium interference fit which occurs when both components conform exactly to their design dimensions. Due to the variations in component size, within normal plastics moulding tolerances, the interference fit between any two components may differ significantly from the preferred value. A range of interference fits which can lead to successful welds under commercial conditions may be defined as extending from a loose fit having a diametric interference substantially less than the medium fit to a tight fit having a diametric interference substantially greater than the medium fit. The specific values of diametric interference for "loose", "medium" and "tight" fits will, of course, vary according to the nature of the components being welded.

In the case of the components constructed and dimensioned as described in our co-pending British patent application No. 8510817, the preferred or medium interference fit between the components is about 0.75 mm (that is, the internal diameter of the body 1 when relaxed is 0.75 mm less than the external diameter of the ring 3 when relaxed). In this case, a loose fit may have a diametric interference of about 0.25 mm and a tight fit may have a diametric interference of about 1.25 mm. As a consequence of these variable degrees of fit between end component and side wall, the contact pressure between the surfaces to be welded, without application of additional radial pressure, can be calculated to range between 0.02 Newtons/mm$^2$ and 0.17 Newtons/mm$^2$.

For one set of welding conditions, for example, derived from experiments using polypropylene rings and bodies, the ideal contact pressure between the surfaces during welding has been found to be about 0.23 Newtons/mm$^2$. It has been shown that for the example quoted, the radial pressure required to maintain the contact pressure between the welding surfaces at about 0.23 Newtons/mm$^2$ needs to be about 0.25 Newtons/mm$^2$ for the loose fit situation of 0.25 mm diametric interference, and about 0.07 Newtons/mm$^2$ for the tight fit situation of 1.25 mm diametric interference. Such pressures enable both extremes of fit to be satisfactorily spin-welded to give a fully-fused integral joint in a total time of about 0.21 seconds at 1000 rpm, wherein 0.05 seconds is required to accelerate the end component to the required speed, and 0.08 seconds is required to electromagnetically brake the system to the stationary position. This total time can be reduced by choosing a greater contact presssure or by increasing the motor speed, or both.

In order for the correct radial pressure to be applied by the tourniquet during welding, it is necessary for the interference fit between the container body and the end component to be measured. Two methods have been shown to be useful and are explained below as examples.

The first is based on the force required to fully assemble the end component into the side wall of the container prior to spin-welding.

It has been found that a substantially linear relationship exists between the interference fit and maximum force of assembly, during which the side wall is caused to deform in an elastic fashion because of the diametric interference between the end component and the side wall, although the general shape of the insertion force profile can be influenced by the design of the container and the end component. The measurement of the insertion force may be made on a preliminary assembly machine which fits rings 3 to bodies 1 or at an assembly station that forms an integral part of the spin welding apparatus.

The second method is based on the measurement, on the spin-welding machine itself, of the current required by the spin-welding servo motor to produce a torque sufficient to spin, at a low speed such as 70 rpm, the end component within the side wall when fully assembled. This is a particularly appropriate method since it is convenient to programme the servo motor to spin at such low speed for say 0.10 seconds at the very beginning of the welding cycle to facilitate engagement of the drive webs 5 on the plug by the corresponding drive pins 29 on the spin-welding head before accelerating to the much higher welding speed. The engagement time can be extended for a short period such as 0.1 second during which time the torque required for slowly spinning the end component within the side wall can be measured and related to a diametric interference between end component and side wall by means of a previously established correlation relationship.

For the components shown in FIG. 1, which relate closely to those described in British patent application No. 8510817, the current required to slow-spin the end components within the side wall has been shown to vary in an essentially linear fashion with diametric interference between end component and side wall. This relationship can be made even more pronounced if a radial pressure is applied to the side wall during measurement. Thus the degree of fit existing between a container body and an end component therefor to be welded can be measured since different fits will require different currents to drive the servo motor at the chosen fixed low speed.

A voltage is generated by a servoamplifier which is an analogue of the motor current. This measured voltage is received in a control system where it is compared with the voltages predetermined to represent various fit types e.g. loose, medium and tight. Each of the various fit types will in practice represent a band of the full range of possible fits extending from the very loose fit to the very tight fit. The sensitivity of the system will depend on the number of such bands which are distinguished.

The control system will also identify and lead to the ejection of assembled components wherein the interference fit is either so loose or so tight that a satisfactory weld will not be possible under the prevailing operating conditions.

When the type of fit has been identified by the control system, a signal is sent to the machine's pneumatic system, choosing one of a series of solenoid valves that each have had their pressure pre-set to suit one of the fit types. Therefore, in this way, the correct external pressure can be applied by the pneumatic cylinder 41 to the cable 39 for any range of fits between the end components and the container bodies. There is, of course, no limit to the fit types which may be identified in this way and the system can provide a direct correlation between the interference fit of the components and the appropriate corresponding radial pressure to be applied.

Although a measurement of voltage has been used in this example as a means for comparing the torque applied by the motor to spin the end component relative to the container body against the frictional force of the interference fit, other parameters relating to this torque could be measured as an alternative according, for example, to the type of motor employed. Thus a predetermined constant torque may be applied by the motor and the resulting speed of rotation measured.

The drive of the servo motor is governed by an amplifier which can be controlled through a programmable logic controller to provide the required time velocity profile for the motor during the welding process. Operation of the motor 17 is timed to the machine cycle from the switch unit 18. On initiation of the weld process the amplifier is energised and the motor is run at a slow speed for a short time to enable the driving pins 29 of disc 28 to engage the external webs 5 of ring 3 and fixed dogs 151 of the ram to engage the webs 4 on the base of the container. After the webs have been engaged, the current required to run the servo-motor at the predetermined slow speed is measured, to classify the interference fit, and the appropriate radial pressure to be applied by the tourniquet is selected. After this the output of the amplifier is ramped such that the motor is rapidly accelerated to its welding process speed and retained at this speed for a period decided by the nature of the particular container type being welded. At the end of the weld time the amplifier is de-energised and the motor is stopped by the friction generated at the weld. Stopping of the motor can also be assisted by braking or by powered ramping down of the speed.

FIG. 8 is a graphic representation of the machine cycle over one rotation of the primary shaft 8. Lines AB and HJ represent the movement of the turret through one indexed motion (i.e. 90° of the secondary shaft 13). The curves CD and FG represent the forward and return movements of the ram. As can be seen, there is a slight overlap of the ram motion with the movement of the turret. In the period defined between points D and F the ram is stationary in its forward position and during this period the welding takes place. During the period D to E the motor 17 is driven at slow speed to enable the fixed pins 29 on the spin welding disc 28 to locate on the webs 5 of the ring and the dogs 151 on the ram to locate on the webs 4 on the base of the container and to allow the appropriate radial pressure PW to be selected. Between the points E and F the motor 17 is accelerated up to weld speed, retained at weld speed for the required period for welding to occur, and stopped either through friction at the weld or through braking means referred to earlier. FIG. 9 is a diagrammatic time(t)/velocity(v) curve for the motor 17 during the period between the points D and F. From FIG. 9 it will be seen that the motor 17 is stopped before the point F. The period XY during which welding takes place can be altered according to the nature of containers being formed.

The current taken by the motor 17 over the welding period XY may be monitored and compared with a previously established datum. If the load on the motor applied by the weld is below a predetermined level, a satisfactory weld will not be formed. By monitoring the current taken by the motor during the weld period, unsatisfactory welds can be identified and the container rejected.

Suitably, the period defined between the points D and F may be of the order of 0.4 seconds.

Whilst a pneumatic cylinder 41 has been described for applying tension to the cable 39 in order to apply an inwardly directed radial pressure to the wall 1 the cylinder 4 may if desired be replaced by a solenoid or a servo motor system connected directly to the cable.

Whilst the cable 39 is able to apply a narrow hoop of radial pressure to the end wall 1 it may be replaced, if desired by a ring of segments each urged against the wall 1 by, for example, pneumatic or hydraulic means.

Figure 10:
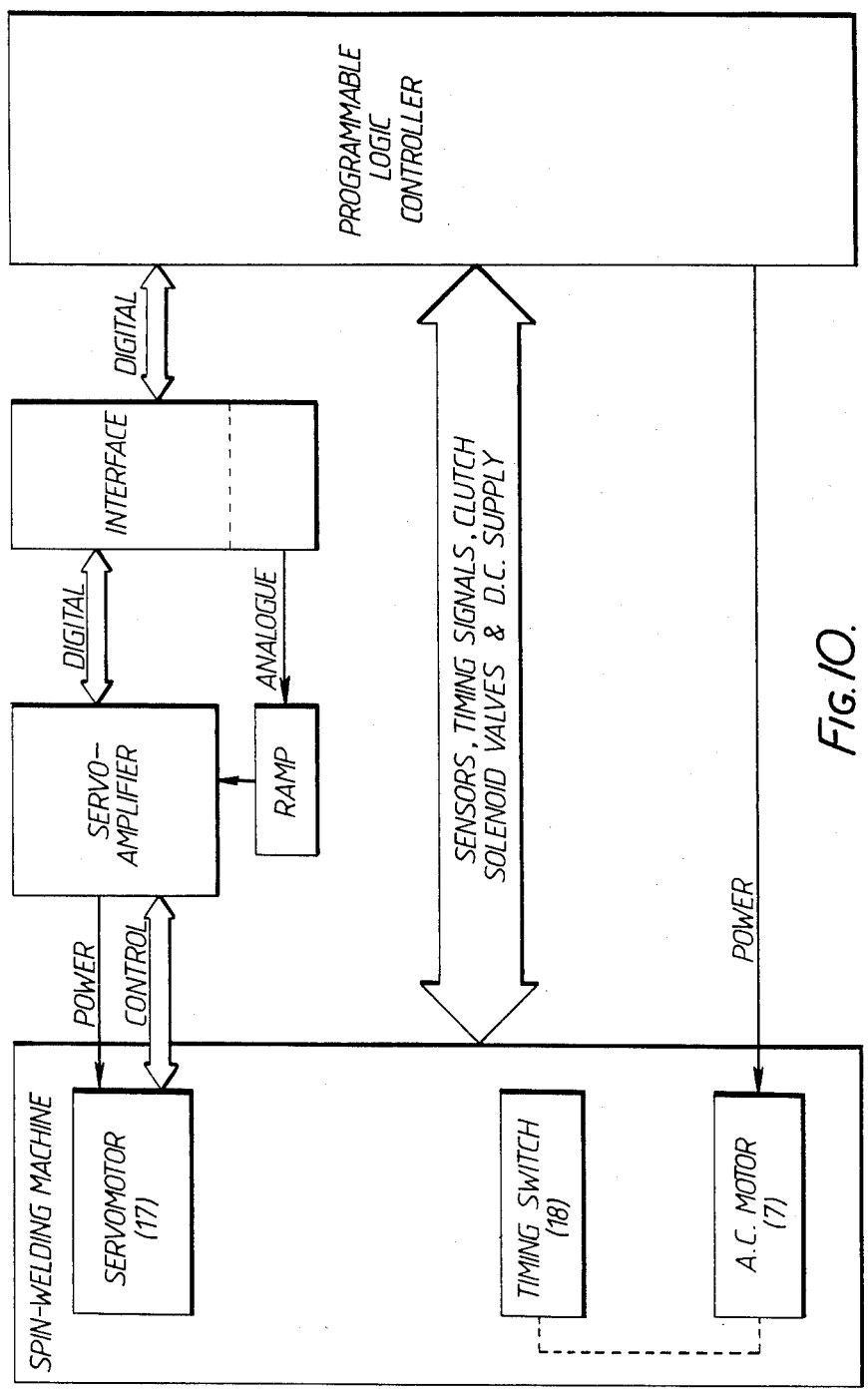
FIG. 10 is a block diagram showing the control system for the spin welding machine.

FIG. 10 shows diagrammatically the functional inter-relationship between the different parts of the apparatus, and in particular, the control connections between the spin-welding machine and the programmable logic controller.

Figure 11:
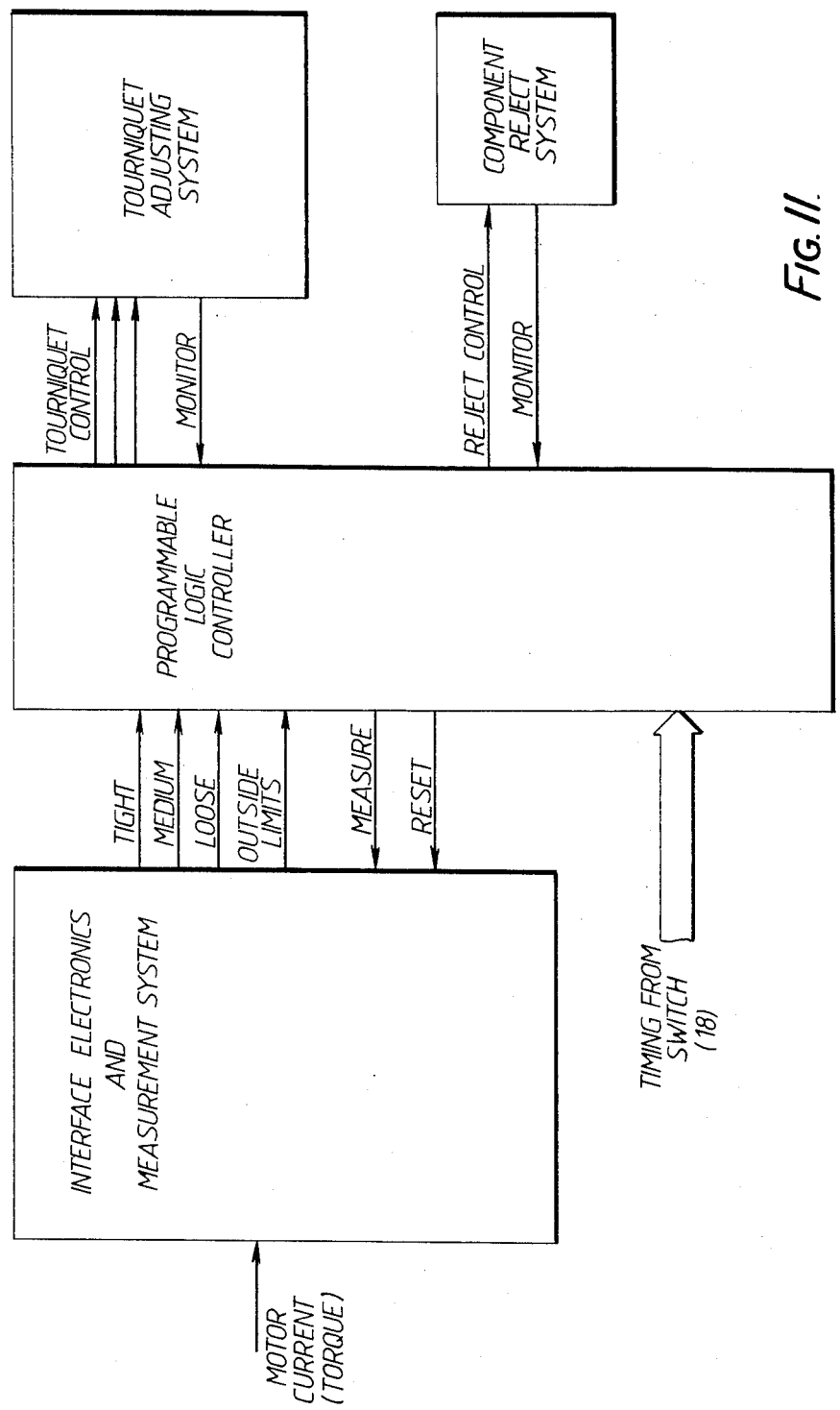
FIG. 11 is a block diagram showing the control system for the device shown in FIG. 6.

FIG. 11 is a diagrammatic representation of the system for controlling the application of radial pressure, and shows in particular the control connections between the electronic system for measuring the parameter which represents the interference fit, the programmable logic controller and the tourniquet adjusting system which adjusts the radial pressure applied during welding.

Figure 7:
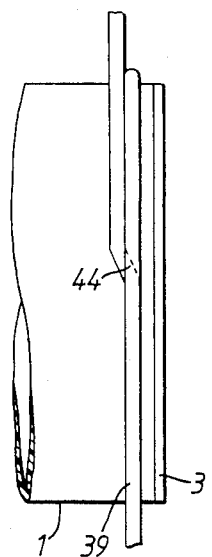
FIG. 7 is a diagrammatic sketch showing the overlap of a wire cable employed in the spin-welding head of the machine.
Figure 12:
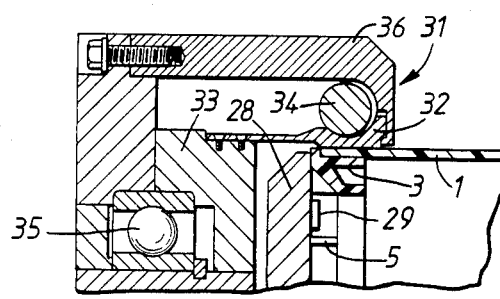
FIG. 12 is a similar view to FIG. 5 but showing an alternative embodiment of the spin-welding head.

An alternative form of spin welding head is shown in FIG. 12. This embodiment, which is shown in connection with an end ring 3 and container wall 1 of simplified profile, is appropriate for use when moulding tolerances can be accurately maintained such that control of the radial pressure "Pw" as provided by the embodiment described in relation to FIGS. 5–7 is no longer required.

In this embodiment a pressure ring 31 acts to provide a constant radial pressure "Pw" during welding and comprises twenty four spring steel segments 32 which effectively form a continuous ring. The segments are cantilevered out from a support ring 33 to which they are attached by screws. A garter type spring 34 is mounted over the segments to provide controlled hoop pressure during the welding process. The support ring is mounted on a ball race 35 such that the whole pressure ring asseably can rotate with the plastics body until the fixed pins on the ram assembly are located against the webs 4 to prevent damage to the external decoration of the plastic body. An annular cover 36 protects the segments and the garter spring 34. It also acts as a stop preventing excessive inward deflection of the segments when no article is inserted into the spinning head.

If a spin welding head according to FIG. 12 is employed, the ram assembly has two functions. The first is to push the pre-assembled containers through the pressure ring 31 and into engagement with the disc 28, and to hold them there with the correct end pressure until the spin welding process is complete. The second function is to pull the now welded containers back to the correct position for transfer to the discharge station. In order to carry out the second function, pivoted clamps (not shown) are mounted on the ram to grip the body 1 during the ram's return stroke.

The method and apparatus described are particularly suitable for welding container components made from thermoplastics materials such as polyethylene, polypropylene, copolymers thereof, or polyamides when in a form flexible enough to yield under the imposed inwardly directed radial force to achieve the interference fit necessary for spin welding. Whilst the invention has been described in terms of radially contracting a cylindrical wall against a plug therein, the same controls of inter-component interference may be achieved in principle by spreading the plug against the interior of the cylindrical wall.

We claim:

1. Spin welding apparatus for welding together two parts of an article comprising a feed mechanism for successively feeding pre-assembled articles to a work station on the apparatus, a spin welding head for spinning one of the parts relative to the other at the work station to form a weld, and a ram assembly for moving articles at the work station into engagement with the spin welding head, wherein the feed mechanism and the ram assembly are driven in timed relation from a first motor-driven shaft and wherein the spin welding head is driven by a servo motor the drive of which is timed by a switch unit driven from the first shaft.

2. Apparatus as claimed in claim 1, wherein the feed mechanism comprises an indexing turret mounted on a second shaft driven from the first shaft through a Geneva mechanism.

3. Apparatus as claimed in claim 1, wherein the first shaft is driven by an AC electric motor through a geared speed reduction unit and a pneumatic clutch.

4. Apparatus as claimed in claim 1 wherein the ram of the ram assembly is driven from a cam mounted on the first shaft.

5. Apparatus as claimed in claim 1 wherein the servo motor is a low inertia DC servo motor and the drive of the servo motor is governed by a programmable logic controller programmed to provide initial slow speed spinning to ensure correct take-up of drive to the articles, rapid acceleration to weld process speed, maintenance of process speed for a required period, and final rapid deceleration and stopping of the motor.

6. Apparatus as claimed in claim 5, wherein the programmable logic controller is connected to the servo motor via an amplifier.

7. Apparatus as claimed in claim 6, wherein the programmable logic controller is programmed to de-energise the amplifier at the end of the said required period such that the servo motor is decelerated and stopped by the frictional forces generated at the weld.

8. Apparatus as claimed in claim 1 wherein the spin welding head comprises means for applying radial pressure to the weld area during welding.

9. Apparatus as claimed in claim 8, wherein the means for applying radial pressure comprises a fire cable tourniquet.

10. Apparatus as claimed in claim 8, wherein the means for applying radial pressure comprises a plurality of resilient segments arranged circumferentially and urged radially inwardly by one or more springs.

* * * * *